United States Patent

[11] 3,591,958

| | | |
|---|---|---|
| [72] | Inventor | William H. Nebgen<br>Woodside, N.Y. |
| [21] | Appl. No. | 49,340 |
| [22] | Filed | June 24, 1970 |
| [45] | Patented | July 13, 1971 |
| [73] | Assignee | Treadwell Corporation<br>New York, N.Y.<br>Continuation-in-part of application Ser. No.<br>844,776, July 25, 1969, now abandoned. |

[54] INTERNAL COMBUSTION ENGINE CYCLE
14 Claims, 9 Drawing Figs.

[52] U.S. Cl. .................................................... 60/13,
60/15, 123/75
[51] Int. Cl. .................................................... F02b 37/00
[50] Field of Search ........................................ 60/13, 15;
123/75 B, 122 D

[56] References Cited
UNITED STATES PATENTS
3,266,234   8/1966   Cook .............................. 60/13
FOREIGN PATENTS
957,086   1/1957   Germany ....................... 60/13

Primary Examiner—Douglas Hart
Attorneys—Robert Ames Norton and Saul Leitner

ABSTRACT: An internal combustion engine cycle is described which comprises: a compression step conducted in an external booster compressor, preferably with cooled suction, such as a supercharger; a final compression step conducted within the cylinder; an external isobaric recuperative heat addition step in which the fully compressed air is heated, preferably to the temperature needed for autoignition of fuel; an isobaric or isochoric fuel injection heat addition step; an isentropic expansion step conducted within the cylinder; a further isentropic expansion step conducted in an external expander, such as the turbine of a supercharger; and finally an external isobaric recuperative heat rejection step.

Each cylinder of the internal combustion engine is provided with four valves, consisting of one set of hot and cold intake valves and one set of hot and cold exhaust valves. Externally compressed air is cooled and introduced into the cylinder through the cold intake valve, thus driving the piston down, and simultaneously cooling the engine elements. On the return stroke of the piston the air is further compressed to the high pressure desired for the succeeding working stroke, is discharged from the cylinder through the cold exhaust valve, is heated by exhaust heat recuperation, for example to autoignition temperature, and is reintroduced into the cylinder through the hot intake valve. Fuel is injected into the cylinder and burned, and gases expand in and are discharged from the cylinder through the hot exhaust valve at above ambient temperature and pressure, and are then cooled by doing external work, which constitutes at least a part of the power required for the compression of the cold air. The work of compression may be reduced by refrigerating the air at the suction of each compressor stage.

FIG. 2
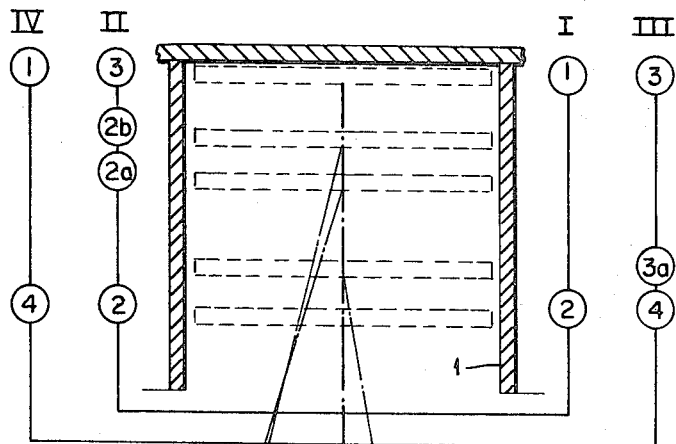
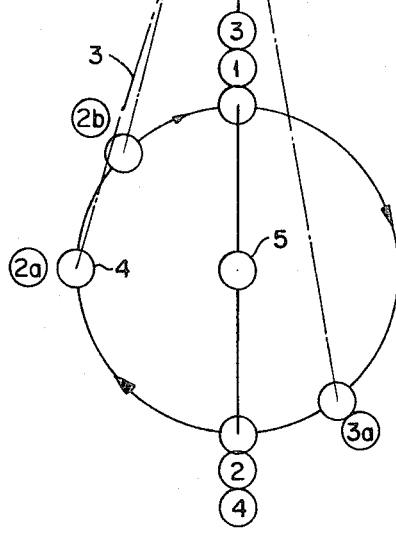
FIG. 3
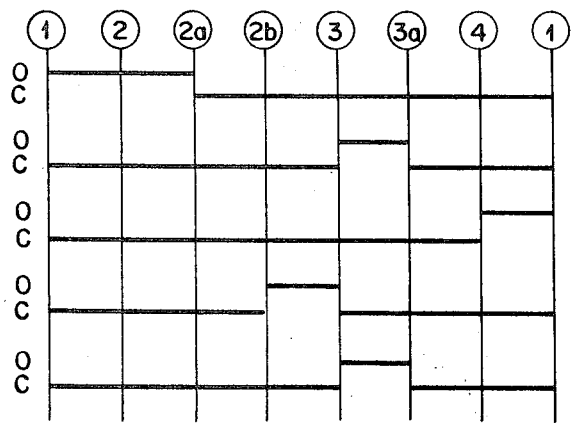
INVENTOR
WILLIAM NEBGEN

INTERNAL COMBUSTION ENGINE CYCLE

RELATED APPLICATIONS

This application is a continuation-in-part of my copending application Ser. No. 844,776, filed July 25, 1969, and now abandoned.

BACKGROUND OF THE INVENTION

The theoretical mechanical work produced by a heat engine is equivalent to the difference between the heat supplied to the engine and the heat rejected by the engine. When a Carnot cycle, or any other reversible cycle is employed, the greatest possible conversion of the available heat to mechanical work, i.e. the maximum thermal efficiency, is a function of the heat supply temperature ($T_1$) and the heat rejection temperature ($T_2$), namely:

$$\text{Thermal efficiency (fraction)} = 1 - \frac{T_2}{T_1}$$

$T_1$ and $T_2$ are absolute temperatures. It is thus evident that maximum efficiency will be achieved when heat supply temperature $T_1$ is as high as possible, and heat rejection temperature $T_2$ is as low as possible. In an isentropic expansion process, the built-in expansion ratio of the engine fixes the ratio of rejection temperature $T_2$ to supply temperature $T_1$. For a given $T_1$ the maximum thermal efficiency is, therefore, also fixed by this expansion ratio.

Efforts to improve the thermal efficiency of reciprocating internal combustion engines operating on a diesel or Otto cycle have mostly been directed towards increasing the compression ratio, since this similarly increases the expansion ratio. As stated above, for a given maximum allowable heat supply temperature, a larger expansion ratio results in a lower exhaust or heat rejection temperature, and gives a correspondingly higher thermal efficiency. However, higher compression ratios involve higher operating pressures, which require more expensive engines; there is a point beyond which the cost per unit of net work output rapidly becomes excessive. In any event, the materials of construction of the engine limit the maximum pressure and temperature that it is possible to use in practice.

The charge volume of a prior art diesel engine is the volume of air contained in the cylinder when the piston is at bottom dead center, and the clearance volume is the volume of air contained in the cylinder when the piston is at top dead center. The ratio of charge to clearance volume is called the compression ratio of the engine. The charge volume is equal to the sum of the clearance volume and the displacement volume; the displacement volume is the volume displaced by the piston as it moves from top to bottom dead center. During the compression stroke, the mass of air which fills the charge volume is compressed into the clearance volume. The reduction in volume causes both the pressure and the temperature of the air to increase. The ratio of the final pressure and temperature to the initial pressure and temperature is exponentially proportional to the compression ratio. The final pressure is limited by the engine materials and the initial pressure is, of course, one atmosphere. The engine materials, therefore, limit the ratio of final to initial pressure and limit the compression ratio as well. Fuel is injected into and is burned with the mass of air which has been heated by being compressed into the clearance volume. The fuel is injected at a rate controlled so as to keep the pressure constant while the piston recedes from top dead center. The outward motion of the piston produces in the cylinder a greater volume, which the original mass of air must fill. In order to keep the air pressure constant at its maximum value, the fuel burned must proportionately increase the air temperature so as to compensate for the increase in volume. Fuel is thus burned at constant pressure until the air temperature has reached a predetermined maximum allowable level. When the fuel is cut off, the original mass of air is at the same pressure, but occupies a larger volume, and is much hotter than when it was compressed into the clearance volume.

This hotter, large-volume mass of air can expand only as far as the original cylinder charge volume. Consequently, the ratio of the charge volume to the volume at the fuel cutoff point is the expansion ratio, which is directly proportional to the charge volume and inversely proportional to the cutoff-point volume. The volume at fuel cutoff is equal to the clearance volume multiplied by the ratio of the cutoff temperature to the temperature reached when the air was compressed into the clearance volume. The expansion ratio is, therefore, much smaller than the compression ratio. Since the pressure in the cutoff volume at the start of the expansion stroke is the same as the pressure in the clearance volume at the end of the compression stroke, the gases remaining in the cylinder at the end of the expansion stroke are necessarily at a higher pressure and temperature than the air in the cylinder at the start of the compression stroke.

In nonsupercharged prior art engines, these relatively hot, relatively high-pressure exhaust gases are discharged directly to the atmosphere.

In supercharged prior art engines the cylinder exhaust gases are used to power a supercharger. This substantially reduces the machinery cost per unit of net work output since the large-volume low-pressure part of the compression and expansion steps is performed in compact, inexpensive, high-capacity centrifugal or turbomachinery, and the expensive low-capacity reciprocating machinery is used only for the high-pressure low-volume part of the cycle. However, the theoretical thermal efficiency of the engine is virtually unchanged, because supercharging merely raises the pressure level of the whole cycle, and the supercharger theoretically discharges its exhaust gases at the same temperature and pressure as does a nonsupercharged engine operating at the same peak temperature and pressure. The construction of the engine still limits the peak pressure and temperature allowable in the cycle, and thereby also limits the maximum theoretical thermal efficiency attainable by the engine, whether or not a supercharger is used.

A theoretical thermal efficiency of about 55 percent is reached in a modern 15.6 compression ratio diesel engine, which takes in air at ambient temperature and pressure, compresses it to 47 atmospheres and 1,220° F., burns fuel to heat the air to 4,540° F., and exhausts the gases from the cylinder at about 4½ atmospheres and 2,150° F. It is possible further to expand these cylinder exhaust gases externally and thereby to obtain a combined theoretical efficiency of about 60 percent, but this must be done by driving work-consuming devices external to the cycle. These external devices may make the improvement in efficiency uneconomical since in many cases the additional cost involved cannot be justified by the fuel saved.

SUMMARY OF THE INVENTION

In the present invention there is used a reciprocating four-stroke cycle engine, in which the cylinder clearance volume is kept as small as possible. As used herein, the term "minimum clearance volume" means the actual volume included between the cylinder head and the piston at top dead center. This volume is the result of the purely mechanical clearance required between adjacent parts; unlike a prior art engine, the volume does not affect the compression ratio of the engine, since it is not necessary for the air contained in the charge volume to be compressed into the clearance volume. Each cylinder of the engine has a hot and a cold intake valve and a hot and a cold exhaust valve. In a multicylinder engine, the engine is provided with a hot and a cold intake manifold, and a hot and a cold exhaust manifold. For compression of the air, in addition to the cylinders of the internal combustion engine, a turbosupercharger is used, preferably with refrigerated suction, which may be in multiple stages and which operates as a booster compressor. Finally, there is used an exhaust heat recuperator in which the fully compressed air is heated, preferably to at least the temperature required for autoignition of the fuel.

The first two strokes of the piston constitute the cooling portion of the cycle, and use the cold intake and the cold exhaust valves. It should be understood that this means relatively cold as in portions of these two strokes the temperature may actually be above ambient, but it is much lower than the temperatures in the two remaining strokes, which use the hot intake and the hot exhaust valves. For simplicity in description, however, the terms "hot" and "cold" will be used in this relative sense. The externally compressed "cold" air which passes into the cylinder through the cold intake valve during the first stroke of the cycle helps to cool internal parts of the engine, such as the piston and cylinder wall. Additional cooling of the engine is, of course, provided by the usual water jacket or cooling fins.

The external exhaust heat recuperator serves to heat the fully compressed air, preferably to a temperature sufficiently high to initiate autoignition of the fuel. This modification of the invention, which permits constant pressure operation during the combustion portion of the cycle, is a preferred modification and will be the first described, but it will be pointed out below that other modifications are possible. Constant-pressure combustion is similar to that which occurs in an ordinary diesel cycle; however, it should be understood that the present invention is not a diesel cycle, although in this modification it does utilize constant pressure combustion. This will become clear from further description and also from a consideration of the very greatly increased efficiencies made possible by the invention.

In a preferred modification of the invention atmospheric air is refrigerated before entering the supercharger, i.e., the booster compressor. The compressed air leaving the supercharger can advantageously be again refrigerated before going to the cold intake manifold and thence through the cold intake valve to the cylinder. The exhaust, intake, and fuel injection valve operations are described herein as occurring at the theoretically ideal point, for example at top or at bottom dead center. A delay or an advance in valve timing is usually desirable in actual practice.

The cold intake valve is opened at the top of the stroke and remains open while the piston first recedes and then comes back through the first, predetermined portion of its return stroke. As has been stated, the refrigerated air serves to cool the internal parts of the engine, including the cylinder and piston, and as a result is itself warmed up, although it may be still well below ambient temperature. The air displaced by the piston during the first portion of the return stroke is returned to the cold intake manifold through the still-open cold intake valve. The temperature level of the refrigerated air is made low enough to compensate for any small heat addition. At a predetermined point of the return stroke, the valve is closed, and as the piston continues to rise, the trapped cool air remaining in the cylinder is further compressed. This mass of trapped air constitutes the quantity of fluid actually working in the cycle.

When the air has been compressed to the desired pressure level, the cold exhaust valve is opened at a second predetermined point of the return stroke. The air trapped in the cylinder may be at a low enough temperature before compression so that ideally it will be at ambient temperature after compression. The piston continues to the end of its stroke, where the clearance volume is very small, and the high-pressure ambient temperature air is expelled almost completely from the cylinder. In one modification, the high-pressure air goes to the cold exhaust manifold, and is passed through an exhaust heat recuperator in which it is heated to at least the temperature required for autoignition. In another modification the high-pressure air goes to the cold exhaust manifold and is passed in series through a low-temperature exhaust heat recuperator and then a high-temperature exhaust heat recuperator. In this latter high-temperature heat recuperator the temperature is reduced to that which an expansion engine, such as a gas turbine, can withstand, and the low-temperature recuperator receives exhaust gases from the turbine. The recuperatively heated high-pressure air then passes into the hot intake manifold.

At the top of the stroke the cold exhaust valve is closed and the hot intake valve is opened, and as the piston recedes, the recuperatively heated air flows from the hot intake manifold into the cylinder.

Fuel is injected at a controlled rate along with the heated air and burns as it is injected. This gradual injection and burning of the fuel cannot be achieved in prior art engines. In the prior art the fuel is injected into the entire working mass of air, and detonation and incomplete combustion are the result. In a preferred embodiment the fuel burns at substantially constant pressure and increasing temperature while the piston recedes. At a predetermined point in the power stroke, the hot intake valve is closed, the fuel is cut off, and the gases continue to expand isentropically, losing both temperature and pressure while they drive the piston to the bottom of its stroke. The high-temperature exhaust valve is opened at about the point where the piston starts its return stroke, permitting the piston on completing the stroke to expel, almost completely, the exhaust gases from the cylinder to the hot exhaust manifold.

In one form of the invention these hot exhaust gases pass through an expansion turbine which drives the supercharger, which is used as a booster compressor. In this modification the amount of fuel injected must be controlled so that the temperature of exhaust gases does not exceed that which the turbine can withstand. The exhaust gases then pass through an exhaust heat recuperator, from which they are discharged to the atmosphere at about ambient pressure and temperature.

In another form of the invention the hot exhaust gases pass first through a high-temperature recuperator, in which their temperature is dropped to that which the turbine can withstand, and then through the expansion turbine, which drives the supercharger. The gases from the turbine pass through a low temperature exhaust heat recuperator from which they are discharged to the atmosphere at about ambient temperature and pressure, as in the form of the invention described above. The relatively cool, high-pressure air flows first through the low-temperature recuperator and then the high-temperature recuperator, in series.

Since the engine operates with a very small clearance volume, at the end of the stroke the exhaust gases are almost completely expelled from the cylinder and the cycle can then be repeated. It should be noted that the hot exhaust gases give up practically all their heat usefully and reversibly, either in the form of work in the expansion turbine driving the supercharger or countercurrently in the recuperators by heating up relatively cold compressed air to the temperature required for autoignition. This is one of the important features of the present invention because in an ordinary diesel cycle a large amount of heat is wasted in the exhaust gases. In the cycle of the present invention, however, this heat is effectively utilized in simple equipment.

The second modification in which a high- and low-temperature recuperator are used increases substantially the work output of the invention, at a slight decrease in thermal efficiency, and for many purposes is desirable.

The above descriptions are of the preferred modifications, but variations can be made by sacrificing some degree of economy or performance while still giving results which are much better than those attainable in ordinary cycles. For example, the entire air compression step can be performed outside of the reciprocating engine, but this adds to the cost. It is also possible to have all of the compression performed by the reciprocating engine, also at an increase in cost. Instead of a refrigerated suction turbocompressor, multistage external compressors with ambient temperature suction and with intercooling to ambient temperature can be substituted, again with some increase in cost and some loss in thermal efficiency. It is also possible to refrigerate the suction of the turbocompressor to such a low level that without further refrigeration the suction temperature of the reciprocating compressor is as low as desired. It is not essential that the combustion be at constant pressure with autoignition since constant volume combustion will produce the same high efficiency, although at a smaller net work output. It is also possible to use a lower recuperator temperature, combined with spark or with glowplug ignition, but this occasions a loss in thermal efficiency.

BRIEF DESCRIPTION OF THE DRAWINGS

FIG. 2 is an operating diagram of FIG. 1 showing various piston positions;

FIG. 3 is a valve diagram for one variant of the invention;

DESCRIPTION OF THE PREFERRED EMBODIMENTS

Figure 1:
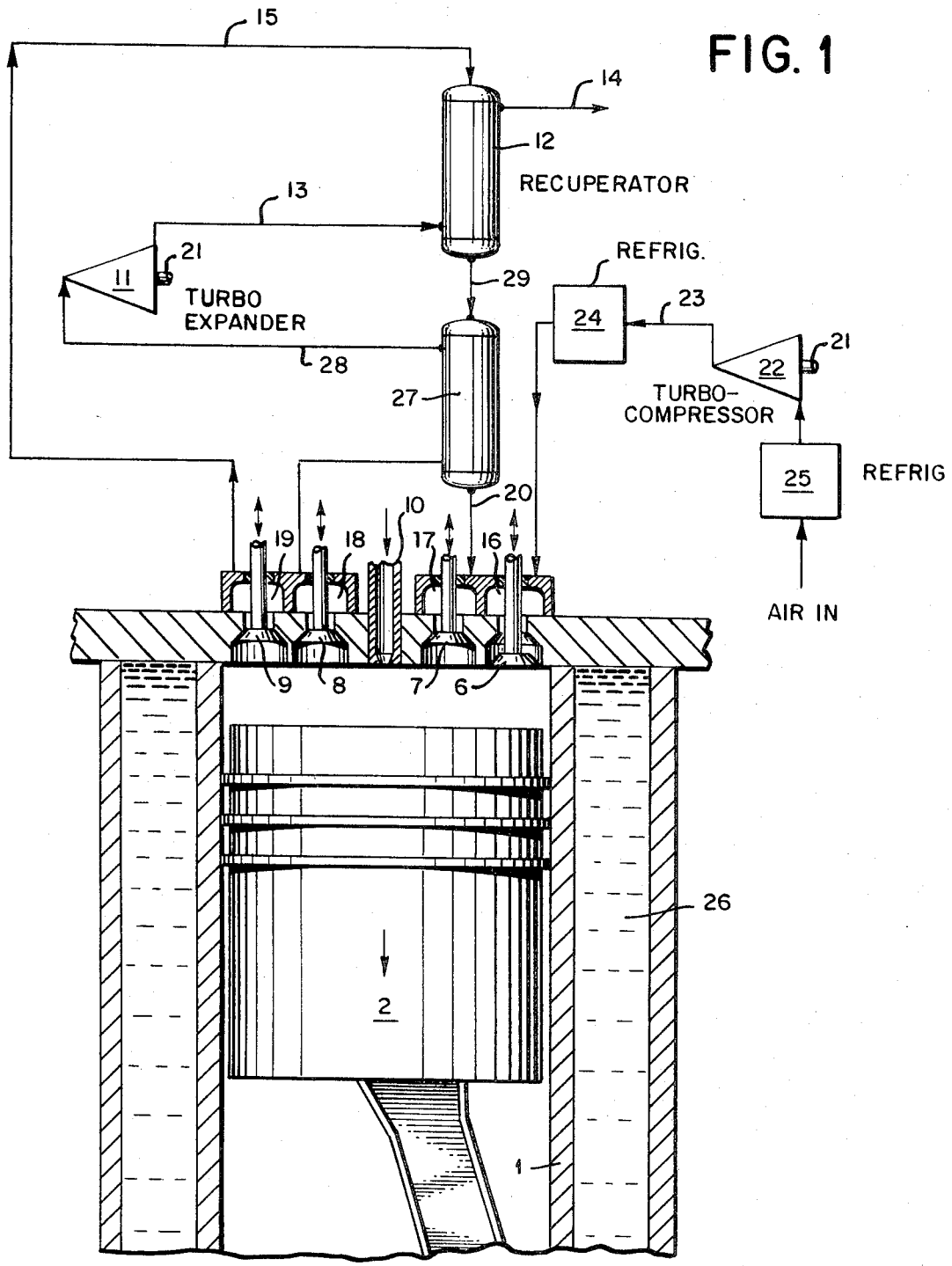
FIG. 1 is a diagrammatic drawing showing a section through one cylinder of an internal combustion engine utilizing the invention, with accessory equipment also shown diagrammatically.

FIG. 1 shows a diagrammatic section through a cylinder of an internal combustion engine using the present invention. The cylinder bears the reference numeral 1, with a conventional water jacket 26, and a piston 2 shown part way down on the first or cold intermediate-pressure air admission stroke. The rotation of the crankshaft is clockwise, as can be seen in FIG. 2. A series of four poppet valves 6, 7, 8 and 9 are provided, valve 6 being for admission of cold intermediate pressure air, and valve 7 for admission of hot high-pressure air; valve 8 is an exhaust valve for hot, relatively low-pressure exhaust gases, and valve 9 is an exhaust valve for cold high-pressure air. A fuel injector 10 is provided and the four valves respectively connect to manifolds 16, 17, 18 and 19. While the drawings show a section through one cylinder only, in practice the internal combustion engine is usually multicylindered, which is why manifolds are shown. Since FIG. 1 shows the piston near the start of its stroke for cold air admission, only valve 6 appears open. In general, the valves are of conventional design, and the actuating mechanisms, such as cams, camshafts and the like, are not shown as their nature is not affected by the invention. Of course, the cams must operate the valves in accordance with the cycle, which will be described.

FIG. 2 is purely diagrammatic and illustrates the position of the top of the piston at a number of points in the cycle. In order to make the drawing less confusing, the diagram shows the top of the piston only. In FIG. 2 the four strokes are shown in Roman numerals, I for the cold intermediate pressure air inlet, II for the cold intermediate-pressure exhaust and subsequent high-pressure compression and exhaust, III for the hot high-pressure air admission, fuel burning, and subsequent isentropic expansion, and IV for the relatively low-pressure, hot exhaust. Stroke I is shown going from top dead center, where the clearance is very small, to bottom dead center. The top dead center position is marked ①, bottom dead center ②, intermediate positions on the up-stroke for II at ②a and ②b, top dead center ③, intermediate position ③a in the power stroke III, bottom dead center ④, and finally, on the up-stroke IV from bottom dead center to top dead center ①. In the intermediate positions the connecting rod is shown with its crank on the circumference of the crankshaft, which rotates about a center 5, and this periphery also shows top and bottom dead center position and the intermediate positions for the various strokes of the four-stroke cycle.

FIG. 3 is a valve diagram which is self-explanatory, the piston positions being shown along the top, the valve numbers with their designations being shown on the left, with two lines corresponding to open and closed periods marked 0 and C respectively. The diagram also shows the open and closed periods of the fuel injector 10.

At the start of stroke I, which is shown in FIG. 1, atmospheric air is refrigerated by the refrigerator 25 at the suction of the turbocompressor 22, which is driven by the shaft 21, as will be described below. The compressed air leaving through line 23 is again refrigerated by the refrigerator 24 to below ambient temperature. The cold, intermediate pressure air is not at the highest pressure of the cycle because, as will be described below, final compression is effected by the piston 2 in the cylinder 1 of the engine. Refrigerators 24 and 25 increase the efficiency of compression. In addition, the temperature of the cold air leaving refrigerator 24 is lower than ambient, so the internal parts of the cylinder are cooled more than they would be by ambient air. Since the maximum allowable operating temperature is the average of the peak and the intake temperatures, a reduction of the intake temperature permits a corresponding increase in the peak temperature. The refrigerators may be conventional in design, so no details are shown and they are indicated on FIG. 1 purely diagrammatically as rectangles. They may also be of multistage design, so as to closely approximate reversible operation.

As the piston descends on stroke I, the intermediate-pressure cold air flows into the cylinder through valve 6. The piston makes a full stroke to bottom dead center ② and then rises on stroke II to the intermediate position ②a. From FIG. 3 it will be seen that the valve 6 has been open during this whole time. Between positions ② and ②a a portion of the cold intermediate-pressure air is blown back into the manifold 16. This is a preferred modification, since it provides a maximum of cooling.

When the piston has reached the point ②a shown on FIG. 2, valve 6 is closed, thus trapping the remaining air in the cylinder. Point ②a is determined by the mass of air which is to be handled in the ensuing power stroke. It will be noted that the intermediate positions ②a, ②b, and ③a are not the same. As the piston continues to rise on stroke II from point ②a to ②b the relatively cold intermediate pressure trapped air is further compressed to the peak cycle pressure. At this point its temperature ideally has reached ambient temperature. Valve 9 is then opened, and as the piston continues its motion the ambient temperature high-pressure air is expelled almost completely from the cylinder to the cold exhaust manifold 19 and thence through the line 15 into an exhaust heat recuperator 12, the partially heated gases then passing through pipe 29 to a high-temperature recuperator 27 where they are heated up to final temperature. These recuperators are of standard heat exchanger design, for example tubes around which hot gases flow, and therefore appear purely diagrammatically on FIG. 1. The recuperators heat up the ambient temperature high-pressure air to a temperature which is sufficiently high so that autoignition of the fuel can occur. The hot high-pressure air leaves the recuperator 27 and enters manifold 17 through line 20.

As the piston starts to move down on stroke III from top dead center position ③, valve 7 is opened, as can be seen on FIG. 3, and admits the hot air. Simultaneously, fuel is injected at a controlled rate through the injector 10, as shown on FIG. 3, and burns at constant pressure while the piston continues to recede to position ③a. Fuel injector 10 is then closed, valve 7 is closed, and the remainder of power stroke III theoretically represents isentropic expansion.

When the piston reaches bottom dead center 4 and starts to rise on its exhaust stroke IV, hot exhaust valve 8 is opened. Valve 8 is designated on FIG. 3 as a relatively low-pressure exhaust valve. The gases are at very high temperature and the pressure is still quite substantial, for example slightly under 2 atmospheres, but it is low compared to the peak cycle pressure which existed at the start of stroke III. From the valve 8 the hot gases go into the exhaust manifold 18 and into a high-temperature recuperator 27 and thence through pipe 28 into the turboexpander 11. The high-temperature recuperator 27 drops the temperature of the exhaust gases sufficiently so that the turboexpander 11 can handle them. This expander drives the shaft 21, which on FIG. 1 drives the turbocompressor 22. In the turbine 11 the hot gases expand to substantially atmospheric pressure and enter the recuperator 12 through the line 13. They are still quite hot and serve countercurrently to heat up the incoming cold high-pressure air, as is described below. During this recuperation the temperature of the hot gases drops to a little above ambient temperature and the gases exhaust to the atmosphere through the exhaust line 14. The highest temperatures employed in the cycle are determined in general by the maximum temperature which the materials in the various elements can stand and are so chosen that each piece of equipment is operated under safe but near optimum conditions. It will be noted that the high-temperature recuperator 27, which does not contain moving parts, can withstand much higher temperatures than can the rapidly rotating turbine 11. This permits higher final temperature in the cycle and, as has been pointed out before, increases output markedly with only a slight decrease in overall efficiency.

At this point it is appropriate to emphasize that because the exhaust is at about ambient temperature and pressure the cycle offers a vast improvement over the standard diesel cycle. Also, the use of refrigerated air on stroke I effects a very substantial cooling of the internal portions of the cylinder. This permits operating the power stroke at a considerably higher peak temperature than would be possible if the pistons and cylinder walls were hotter by virtue of their being cooled with much warmer air, as is the case in a prior art diesel cycle. It has been pointed out above that the theoretical cycle efficiency depends on the maximum permissible peak temperature and on the minimum achievable final exhaust temperature. In both respects the present invention is significantly better than even the best diesel cycle.

Figure 4:
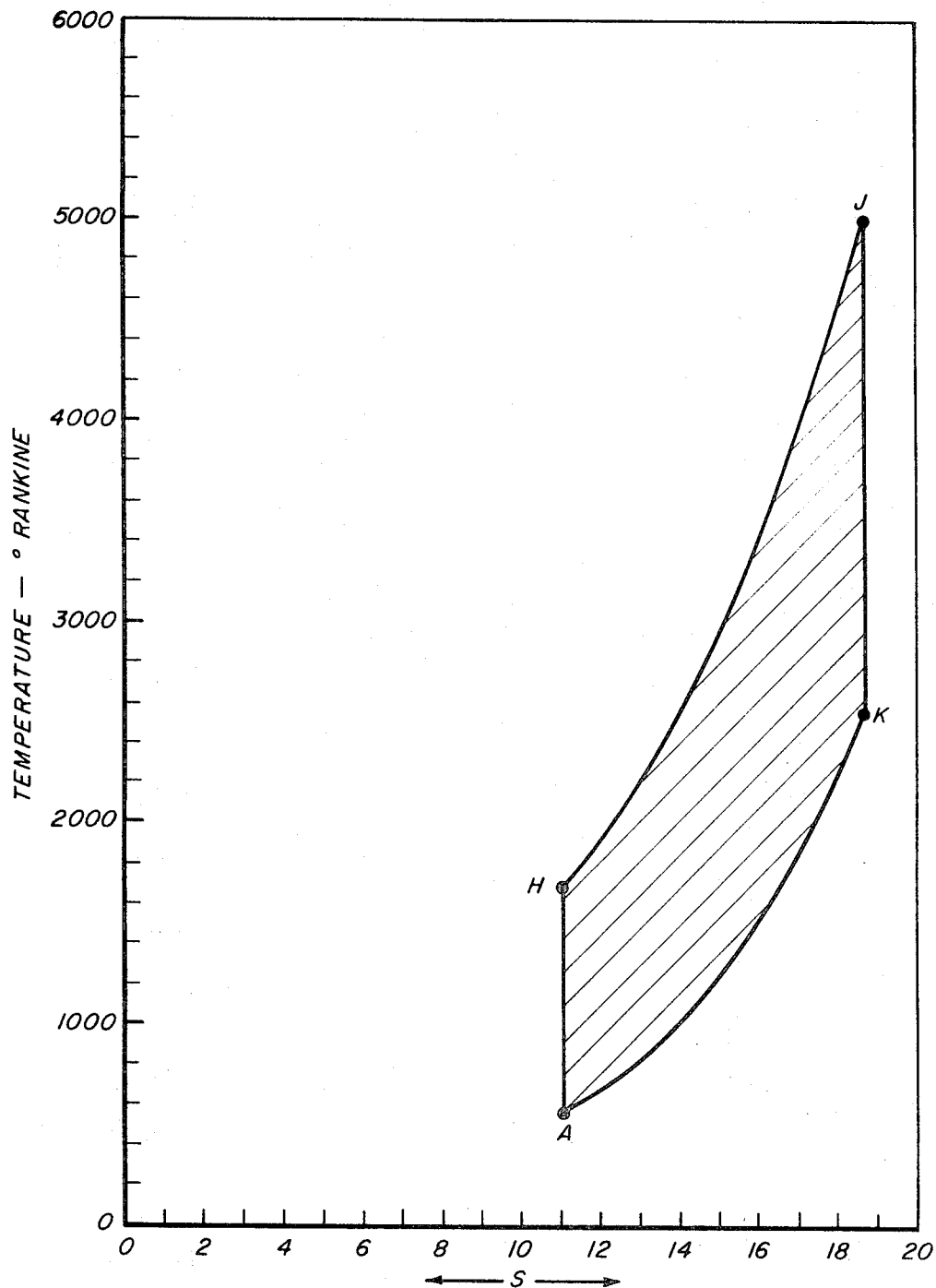
FIG. 4 is a temperature-entropy diagram of a diesel cycle.

The advantages of the present invention can be brought out by considering FIG. 4, which is a temperature-entropy diagram of a standard, efficient, modern diesel cycle; FIG. 8, which shows on a similar diagram the same cycle with utilization of cylinder exhaust energy; and FIG. 6, which is a similar diagram of the preferred modification of the present invention which has just been described. On each diagram, the amount of useful work produced is proportional to the cycle area enclosed. On FIGS. 4 to 8 these areas are shown lightly hatched to bring out more clearly their differences.

On FIG. 4 a standard modern 15.6 compression ratio diesel cycle is represented by A—H—J—K—A. A is at 1 atmosphere pressure and about 100° F., H is at 47 atmospheres and 1,200° F., J is at 47 atmospheres and 4,540° F., and K is at 4.66 atmospheres and 2,150° F. Path A—H represents isentropic compression, H—J isobaric heat addition, J—K isentropic expansion, and K—A isochoric heat rejection. The theoretical efficiency is about 55 percent. It should be noted that theoretical efficiencies are used when comparing cycles. The efficiency of an actual engine is less than theoretical because of pressure drop, friction, and other mechanical losses in the engine.

Referring to FIG. 8, point K is at a temperature of 2,150° F. and 4.66 atmospheres pressure. Theoretically, this air can produce additional work if compounded or passed through a turboexpander, but in practice it is too hot to use and must first be cooled isochorically to about 1,500° F. and 2.27 atmospheres before it can be expanded isentropically to one atmosphere and 920° F. in a turboexpander. On FIG. 8 this isochoric cooling is the path between K and M, and the isentropic expansion is the path between M and N. The cycle is represented by A—H—J—K—M—N—A, with points A, H, J and K being the same as on FIG. 4. The temperature of the air at the discharge of the compressor at point H is about 300° F. higher than the turbine exhaust temperature at point N, so it is impossible to recuperate exhaust heat, and this represents one of the principal unavoidable inefficiencies of a diesel cycle. The use of an expansion turbine from point M to point N theoretically increases the efficiency to about 60 percent, but only if the work energy thus derived from the cylinder exhaust gases is used to drive a generator or some other work-consuming device external to the engine cycle. If the work energy is used to drive a supercharger for the engine, theoretically no increase in efficiency is obtained.

Figure 6:
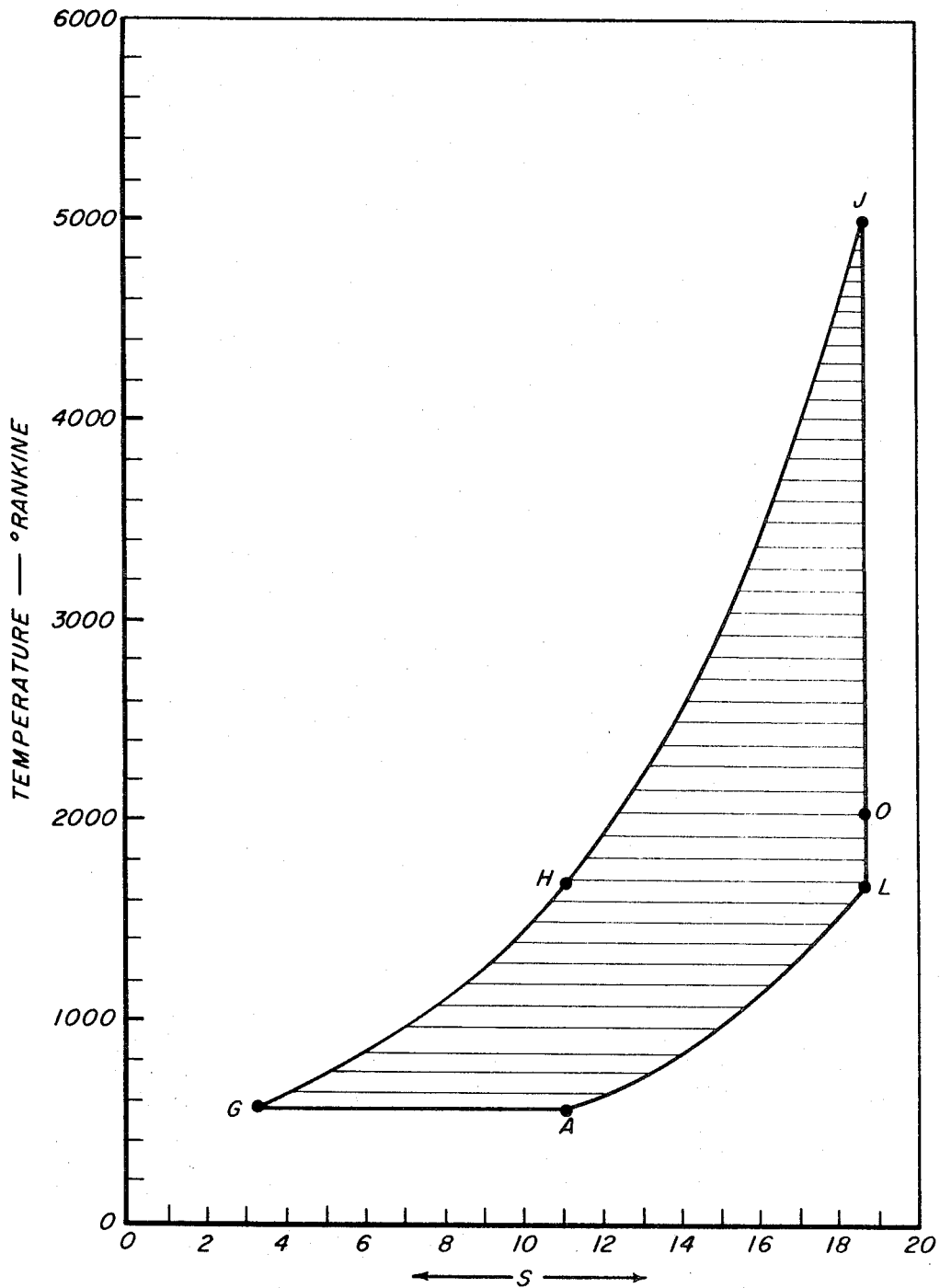
FIG. 6 is a similar diagram of a preferred embodiment of the present invention using constant pressure combustion.

Diagram A—G—H—J—L—A of FIG. 6 portrays the cycle of a preferred form of the invention having a theoretical thermal efficiency of about 82 percent, which is almost 50 percent more than the standard diesel cycle illustrated in FIG. 4. Point A, as in FIG. 4, is at one atmosphere and 100° F.; point G, after compression, is at 47 atmospheres and 100° F.; recuperative heating in the external recuperator 12 brings the air at point H to 47 atmospheres and about 1,200° F. During the fuel injection part of the power stroke the temperature rises to 4,540° F. at point J. It will be noted that this is the same temperature which was assumed for the standard diesel cycle of FIG. 4; the temperature was standardized in order to facilitate comparisons of the various cycles, and no advantage has been taken of the fact that the piston and cylinder walls have received additional cooling from the cold high-pressure air in strokes I and II and that in the invention point J could safely be at a higher temperature. Point O is at 1.78 atmospheres and 1,500° F. and point L is at one atmosphere and 1,200° F. Path A—G represents isothermal compression which can be closely approximated by using sufficient stages of refrigeration. The compression can be partially or wholly outside of the working cylinder. Path G—H is recuperative isobaric heat addition. H—J is direct isobaric heat addition by combustion of fuel, as was the case in FIG. 4. J—O is isentropic expansion in the engine cylinder, O—L is isentropic turbocharger expansion, and L—A is recuperative isobaric heat rejection. The air-compression step A—G can be conducted completely external to the reciprocating engine, but the highest pressure portion of this compression is most economically effected in the engine cylinder itself. When the compression is conducted with multistaged refrigerated suction, the engine cylinder exhaust gases can furnish energy to power the supercharger so that it provides a ratio of compression of about 6.6. Of the total required ratio of 47, cylinder compression must therefore provide only a 7.1 ratio.

Heating the air in the recuperator at constant pressure causes a substantial increase in air volume. This volume increase is made to produce work by having the air pass through the hot intake valve, and move the piston of the engine. With a manifolded multicylindered engine, which is preferred, the quantity of air withdrawn from the manifold is simultaneously replaced by a fresh charge of air which has been compressed in one of the other cylinders and heated in the recuperator. The manifold pressure thus remains nearly constant.

The temperature at point J on the diagram is the peak temperature of the cycle. The pressure at the end of the piston stroke, which is shown at O, is about 1.78 atmospheres, and the temperature is approximately 1,500° F. The minimum clearance volume which is a feature of the present invention enables the piston to expel almost completely the high-temperature exhaust gases from the cylinder.

In the present invention, as in prior art engines, the expansion ratio is the ratio of the charge volume to the volume of air contained in the cylinder when the fuel is cut off. In the present invention the expansion ratio is completely independent of the compression ratio or of the maximum allowable operating pressure; it is fixed instead by the volume of high-pressure heated air which is contained in the cylinder when the fuel is cut off. This volume may be selected to give any desired cylinder exhaust temperature. The cylinder exhaust temperature is the same as the turboexpander inlet temperature, and current practice limits this temperature to a maximum of about 1,500° F. With prior art engines, the required temperature reduction is accomplished by an energy-wasting blowdown, and the cylinder exhaust valves are subjected to a much higher temperature as well.

Theoretically, the only thermal irreversibility in the preferred form of the invention is the difference between the 1,200° F. temperature of the high-pressure air leaving the recuperator point H and the peak cycle temperature of 4,540° F. (point J). This irreversibility limits the theoretical thermal efficiency to 82 percent. Even if the recuperator materials could withstand 4,540° F., and so permit the compressed air to be heated to this peak cycle temperature, the theoretical thermal efficiency of the cycle would increase to only about 89 percent, which is exactly the same as a Carnot cycle operating between the same temperature limits of 4,540° F. and 100° F. However, in order to achieve maximum efficiency it is still important that the temperature of the air leaving the recuperator be as high as possible. Current recuperator design practice restricts this temperature to about 1,200° F. The turboexpander must therefore operate with a 1,500° F. inlet and a 1,200° F. exhaust temperature. This theoretically requires isentropic expansion from a pressure of 1.78 atmospheres to a pressure of 1 atmosphere.

Minimum clearance volume was defined above as the actual volume between the piston and the cylinder head resulting from the purely mechanical clearances required between these parts. The cool air remaining in this volume at the end of the compression stroke cannot be heated in the recuperator. This reduces the cycle efficiency. On the ensuing power stroke, this same cool air blends with and cools the recuperatively heated hot air. This also reduces the cycle efficiency. The hot exhaust gases remaining in this volume at the end of the exhaust stroke blend with and heat the incoming refrigerated air, and the heat of the exhaust gases is, therefore, not available in the recuperator. This further reduces the cycle efficiency. The incoming air must be refrigerated to a lower level in order to compensate for this unwanted heat input, and this also reduces the cycle efficiency. It is therefore desirable for maximum efficiency, but not essential for operation, that this minimum clearance volume be kept as small as possible.

The maximum temperature at point J is also limited, in this case by the construction of the reciprocating engine. The optimum thermal efficiency results when there is an isentropic work-producing temperature drop from the maximum allowable peak cycle temperature J to the maximum allowable recuperator temperature L. For the given temperature conditions this drop theoretically occurs when the initial pressure of the overall expansion process is 47 times its exhaust pressure. This is the optimum condition. If a higher initial pressure is used, the temperature at L will be lower than the maximum, and the thermal efficiency will suffer; if a lower initial pressure is used, the temperature at L will exceed the maximum allowable, thus necessitating isochoric cooling, and the thermal efficiency will again suffer.

The existence of an optimum initial expansion pressure, which is also the optimum peak operating pressure, is unique to the present invention. Although the initially low thermal efficiency of prior art engines continues to improve with every increase in operating pressure, an impossibly severe operating condition of more than 2000 atmospheres at 4,540° F. would be required to have a prior art engine approach the thermal efficiency of the preferred cycle of the invention.

In one variant of the invention an identical theoretical thermal efficiency of 82 percent is reached when the fuel is burned at constant volume instead of at constant pressure. This constant volume combustion variant also employs refrigerated suction compression and full heat recuperation, with the same maximum temperature and pressure as in the previously described preferred form of the invention. Instead of the maximum mechanical compression of 47 atmospheres required in the constant pressure process, the constant volume process requires a mechanical compression of only 15.8 atmospheres. The remainder of the 47 atmospheres final pressure results from the constant volume addition of heat to the air in the cylinder. The recuperator must therefore be constructed to withstand a pressure of only 15.8 atmospheres instead of 47 atmospheres, and the recuperator, manifolding, valving and piping are substantially cheaper. However, the net work output of an engine having a given displacement is somewhat less than for the preferred case, and the selection of either the constant pressure or the constant volume process can be made on the basis of an overall economic evaluation. Constant volume heat addition differs from constant pressure heat addition in the timing and in the rate of fuel injection. In the constant volume process the fuel is injected rapidly, theoretically instantaneously, after the piston has progressed through a part of the power stroke and after or about the time the hot intake valve is closed. In the constant pressure process the fuel is injected simultaneously with the preheated combustion air at a rate controlled so as to maintain the pressure constant.

Figure 7:
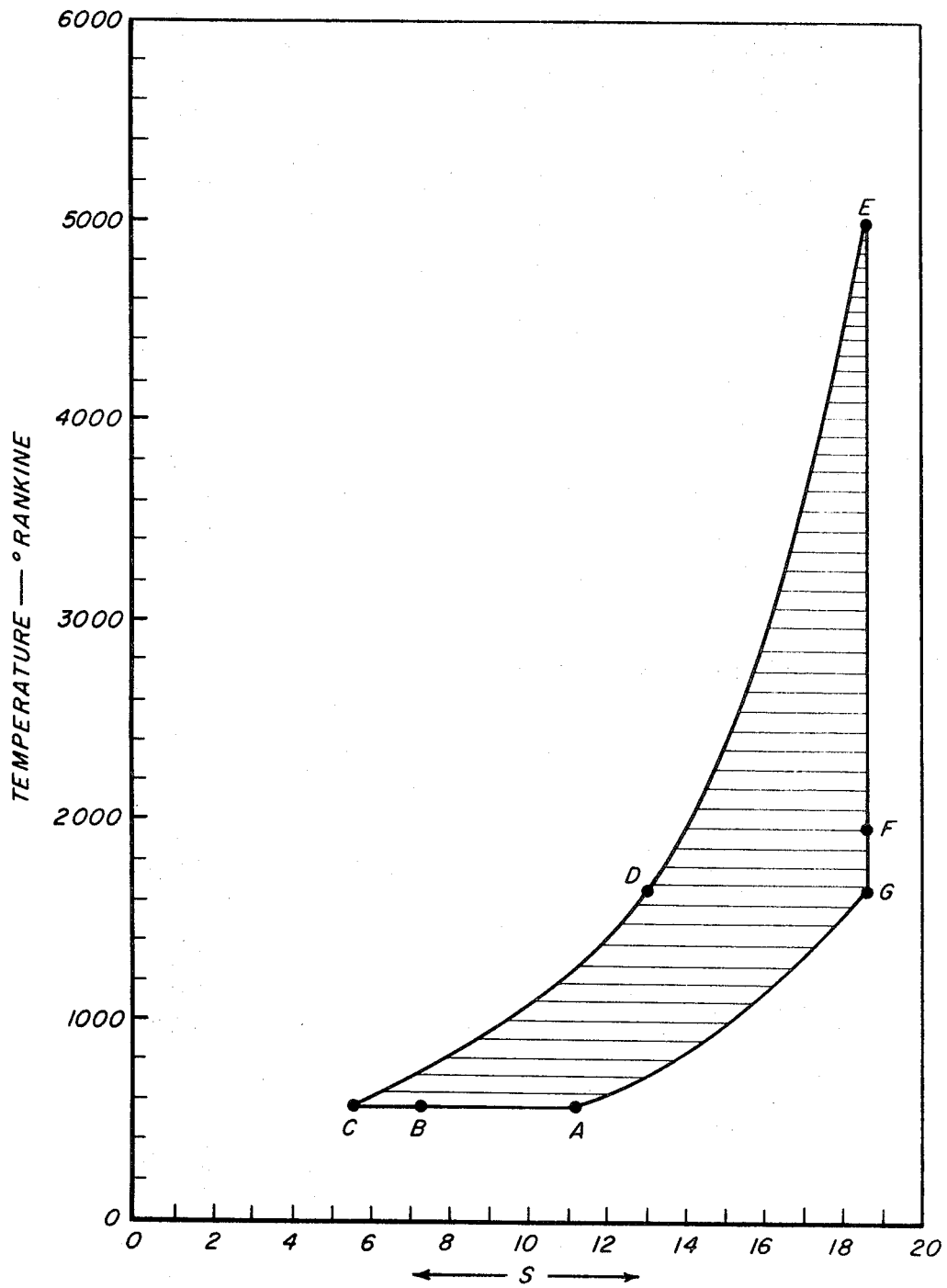
FIG. 7 is a similar diagram of another variant of the invention using constant volume combustion.
Figure 8:
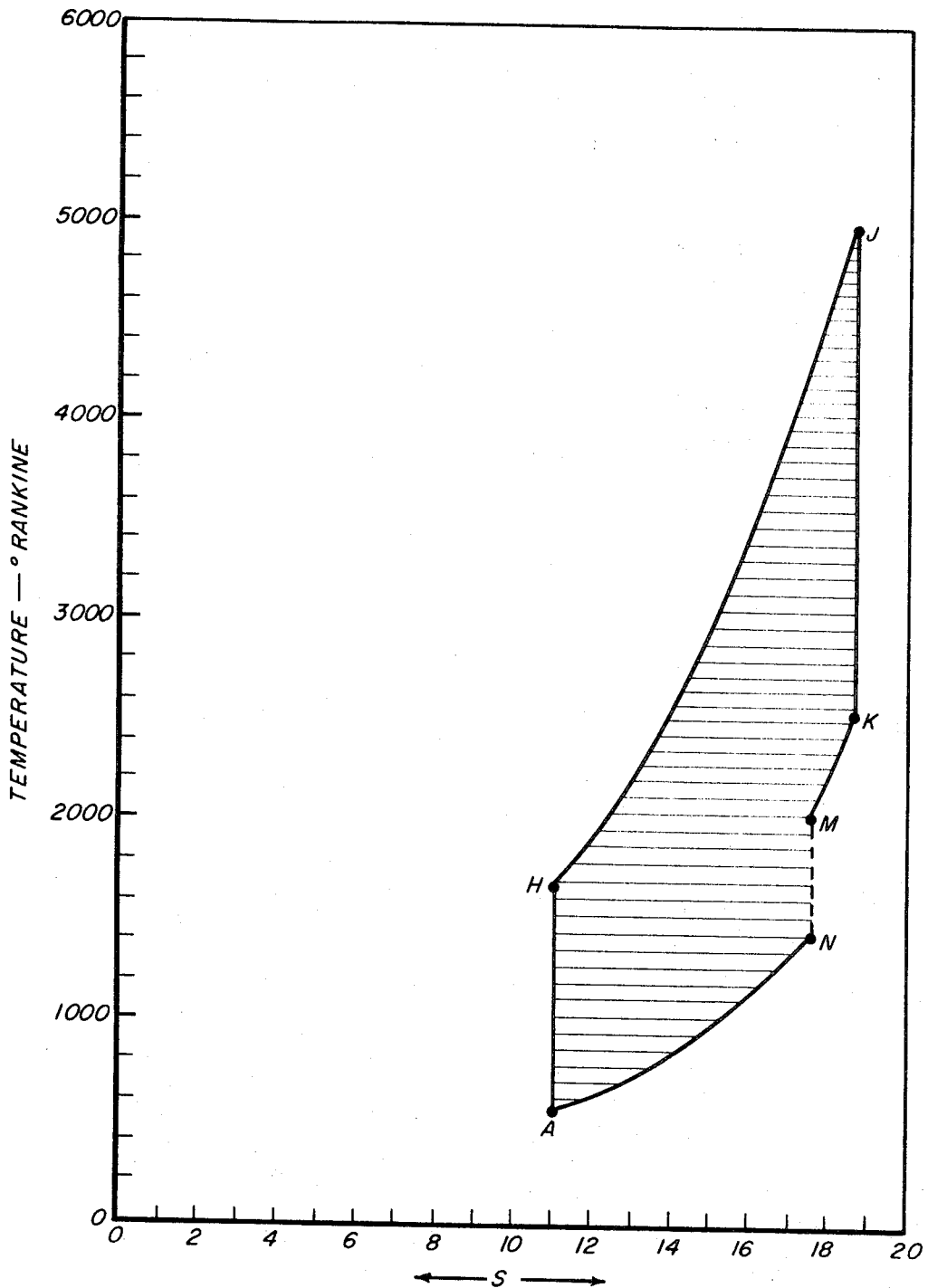
FIG. 8 is a similar diagram of a variant of a standard diesel cycle.

This variant of constant volume heat addition is shown in A—C—E—G—A of FIG. 7. A—C represents an isotherm, C—D an isobar, D—E is an isochor, E—G is an isentrope, and G—A is an isobar. Point A, as before, is at 1 atmosphere and 100° F., point B is at 6.6 atmospheres and 100° F., point C at 15.8 atmospheres and 100° F., point D at 15.8 atmospheres and 1,200° F., point E at 47 atmospheres and 4,540° F., point F at 1.78 atmospheres and 1,500° F., and point G at 1 atmosphere and 1,200° F. A—B represents the isothermal work required for external turbocompression, equal to the work derived from external isentropic turboexpansion; B—C isothermal compression work required of the reciprocating engine; C—D external isobaric recuperative heat addition; D—E direct heat addition at constant volume; E—F isentropic reciprocating engine expansion; F—G external isentropic turboexpansion; and G— A isobaric recuperative heat rejection.

Figure 5:
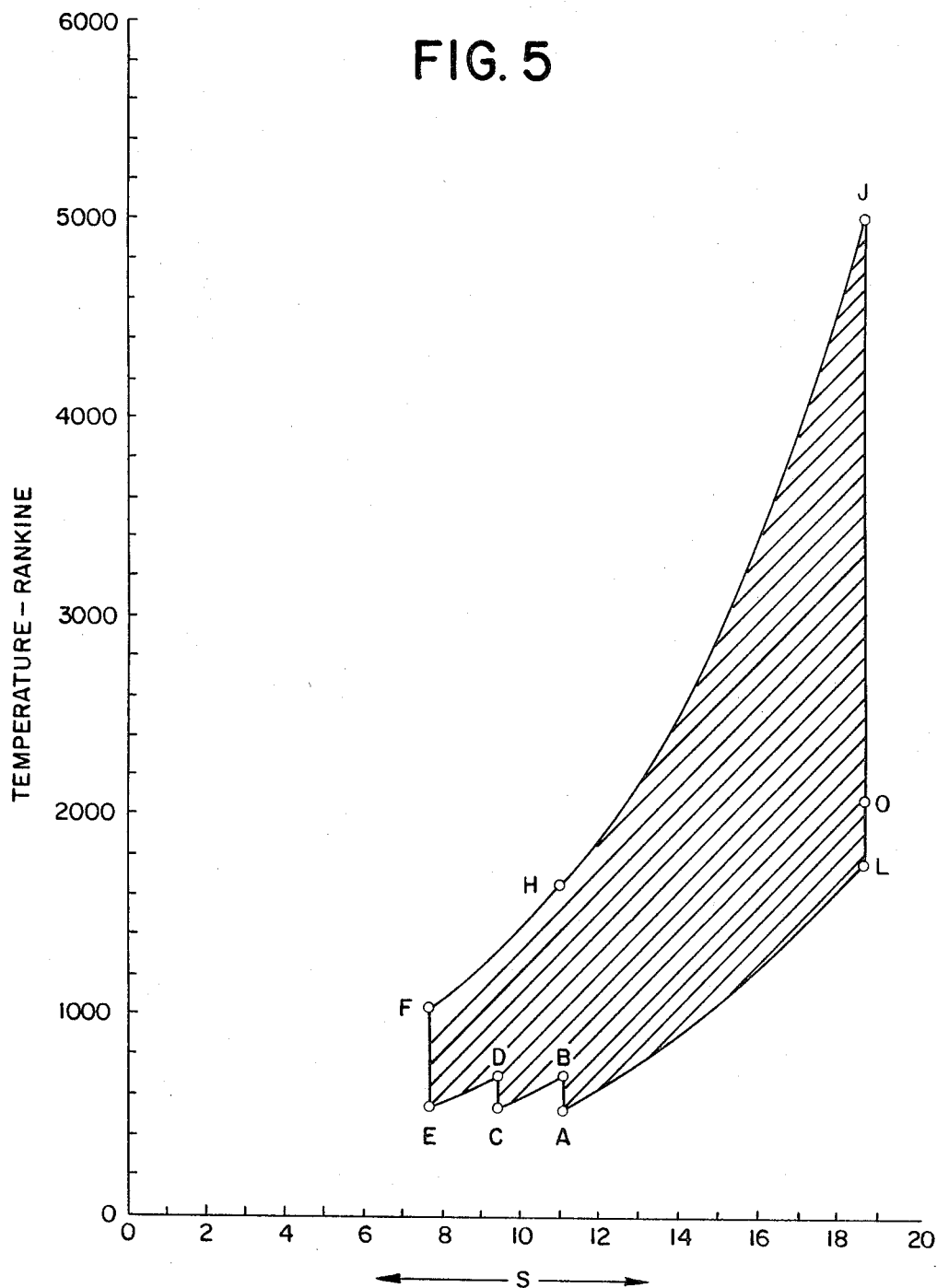
FIG. 5 is a similar diagram of one variant of the invention, using multistage intercooled external compressors.

In another variant of the present invention, multistage compressors intercooled to ambient temperature are used, shown as path A—B—C—D—E—F on FIG. 5. The theoretical thermal efficiency of this cycle is about 76 percent. A—B and C—D represent external compression to a total of about 5.3 atmospheres, and E—F represents engine cylinder compression from 5.3 to 47 atmospheres. The energy required for the external booster compression steps A—B and C—D is provided by the final expansion of the engine cylinder exhaust gases from point O (1.78 atmospheres, 1,500° F.) to point L (1 atmosphere, 1,200° F.) in suitable high-capacity turbomachinery. Step E—F, amounting to a ratio of compression of about 8.9, must be provided in the engine cylinder. (In the preferred form of the invention the compression work is reduced by the use of refrigerated suction, so that the same amount of work energy recovered from the cylinder exhaust provides a greater ratio of external compression in the preferred form than in this variant.) The turbine exhaust temperature (point L) is about 640° F. higher than the compressor discharge temperature (point F), so a substantial amount of exhaust heat recuperation is possible.

The theoretical efficiency of 76 percent is not quite as high as the previously described preferred embodiment which has been illustrated in FIG. 6, but it is still much higher than can be reached by even the best of prior art engines. The elimination of refrigeration at times may be of economic interest, and it is an advantage of the present invention that various modifications may be used in order to obtain the best economic compromise in all cases.

Figure 9:
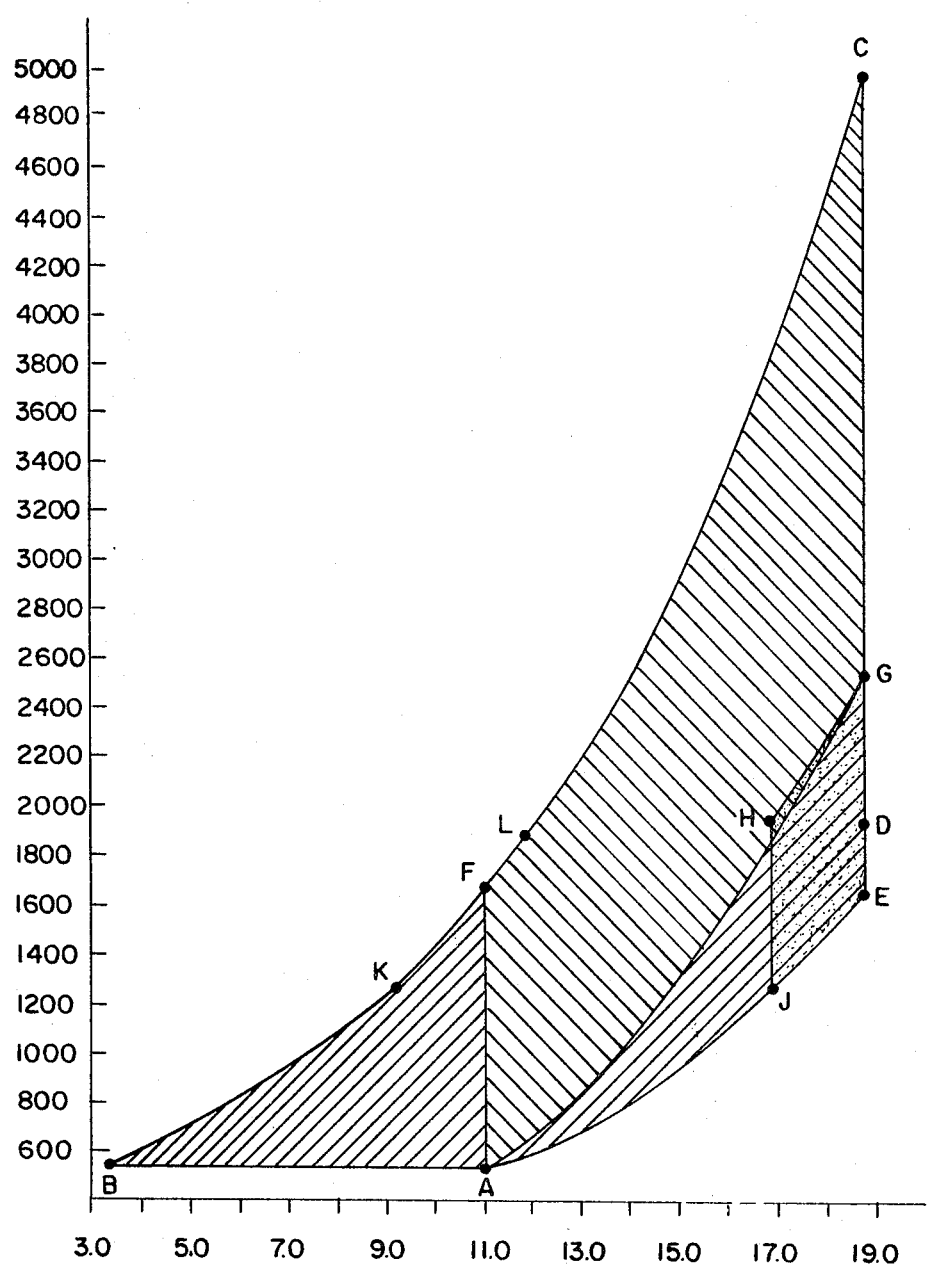
FIG. 9 is a variant of FIG. 5, in which the high-temperature and the low-temperature recuperators are shown.

On FIG. 9, A—F—C—G—A represents a standard diesel cycle, and A—B—C—E—A represents a cycle in accordance with the invention, wherein B—F is a low-temperature recuperator. Lines of constant volume have also been shown on this diagram, and it will be seen that point D is located in the 800 ft.$^3$ volume line. From the earlier discussion, point D also represents the displacement of the engine. Point G, in the standard diesel cycle, lies on the 408 ft.$^3$ volume line. An engine built in accordance with the invention would therefore require almost twice the displacement of a standard diesel per pound mol of air handled, and although it would produce much more work per pound mol, and at a much greater efficiency, its BMEP would be only 80 percent of a standard diesel.

A—B—K—L—C—G—H—J—A represents a modification of the invention, wherein B—K—J—A is a low-temperature recuperator and K—L—G—H is a high-temperature recuperator. The theoretical thermal efficiency of the modified cycle is about 80.5 percent and its BMEP is about 40 percent more than that of the standard diesel cycle, which has a thermal efficiency of only 55 percent. In this modification of the invention, point L theoretically is at about 1,420° F., which is higher than currently available recuperator designs will permit. However, in practice a temperature difference must exist between the exhaust gases and the incoming compressed air, so that in actual practice temperature of the incoming compressed air will not exceed the somewhat flexible limit of about 1,200° F.

I claim:

1. In a four-stroke cycle reciprocating internal combustion engine having fuel-introducing means, the improvement which comprises in combination,
    a. means for compressing air externally of said engine, and cooling means to produce compressed air at a predetermined temperature,
    b. inlet valve means for permitting the compressed cooled inlet air to enter the cylinder of said internal combustion engine during the suction stroke of the four-stroke cycle of the engine, whereby the relatively cold inlet air contributes to cooling down the engine cylinder, said inlet valve means operating to open near top dead center of the suction stroke and to close at a point when a predetermined working volume of air is established,
    c. cylinder exhaust valve means for the cooled air which is closed during the entire suction stroke and opened during the compression stroke when the compressed air is at peak cycle pressure,
    d. heat exchanging means for two gas streams and for maintaining said streams separate, said means having inlet means for the cooled compressed air from the cylinder at peak cycle pressure and outlet means for heated compressed air, and means for passing the compressed air through the heat exchanging means,
    e. a second cylinder inlet valve means, means connecting said second inlet valve to said heated compressed air outlet means from said heat-exchanging means and for opening the valve at about top dead center of the next succeeding power stroke, whereby compressed air heated in the heat-exchanging means is introduced into the cylinder and means for holding open said second inlet valve means until a predetermined volume of hot compressed air has entered the cylinder and then closing said second inlet valve means,
    f. means for introducing fuel and burning it in the cylinder during at least a portion of the period during which said second inlet valve means is open,
    g. a second cylinder exhaust valve means, an external gas expansion engine, and means for introducing hot exhaust gas originating in the cylinder into the inlet of said expansion engine, said second exhaust valve means having means to open it near bottom dead center of the power stroke and to maintain it open throughout the next succeeding or exhaust stroke, whereby hot high-pressure exhaust gases originating in the cylinder expand in the expansion engine to approximately ambient pressure and develop power, and means for connecting the outlet of said expansion engine to at least a portion of said heat-exchanging means whereby the low pressure exhaust gases from the engine are cooled and give up their heat to the cooled air at peak cycle pressure.

2. An internal combustion engine according to claim 1 in which the heat-exchanging means comprises two sections through which the cooled high-pressure air at peak cycle pressure passes in series and is heated, and the hot exhaust gas passes countercurrently thereto and is cooled, the first section being of dimensions sufficient to reduce the temperature of said hot exhaust gases to one which the expansion engine can withstand and the second section is connected to the exhaust of the expansion engine.

3. An internal combustion engine according to claim 1 having multiple cylinders and cold air inlet and exhaust manifolds and hot air inlet and exhaust gas manifolds connecting to the cold air and hot air inlet and exhaust valves, whereby surges in the flow of the hot and cold gases are minimized.

4. An internal combustion engine according to claim 1 in which the distance between the piston and cylinder head at top dead center is not substantially in excess of the minimum clearance required to avoid mechanical interference of adjacent parts.

5. An internal combustion engine according to claim 1 in which the external gas expansion engine drives the external air-compressing means and supplies at least a portion of the power for compression.

6. An internal combustion engine according to claim 2 in which the external gas expansion engine drives the external air-compressing means and supplies at least a portion of the power for compression.

7. An internal combustion engine according to claim 1 in which the compressed air leaving the heat-exchanging means is at a temperature sufficiently high to effect autoignition when the fuel is introduced.

8. An internal combustion engine according to claim 2 in which the compressed air leaving the higher temperature section of the heat exchanging means is at a temperature sufficiently high to effect autoignition when the fuel is introduced.

9. An internal combustion engine according to claim 1 in which the fuel-introducing means starts at approximately the time the second inlet valve is opened and combustion during fuel injection is substantially at constant pressure.

10. An internal combustion engine according to claim 2 in which the fuel-introducing means starts at approximately the time the second inlet valve is opened and combustion during fuel injection is substantially at constant pressure.

11. An internal combustion engine according to claim 1 in which the fuel introducing means introduces fuel after a predetermined volume of hot compressed air has entered the cylinder through the second inlet valve means and the fuel is burned at a rate to increase pressure within the cylinder.

12. An internal combustion engine according to claim 2 in which the fuel-introducing means introduces fuel after a predetermined volume of hot compressed air has entered the cylinder through the second inlet valve means and the fuel is burned at a rate to increase pressure within the cylinder.

13. An internal combustion engine according to claim 11 in which the hot compressed air introduced through the second inlet valve means is at autoignition temperature.

14. An internal combustion engine according to claim 12 in which the hot compressed air introduced through the second inlet valve means is at autoignition temperature.